Patented July 19, 1927.  1,636,554

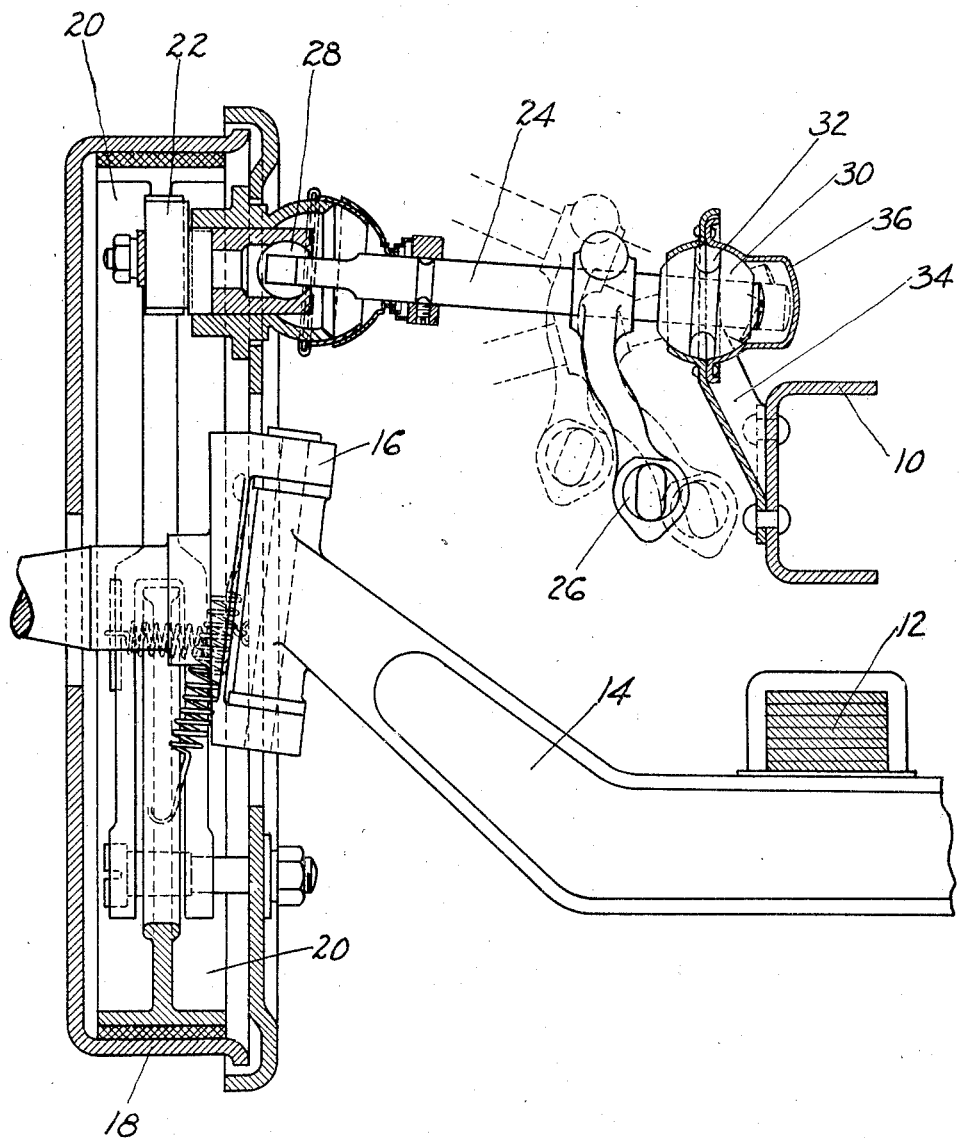

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed May 11, 1925. Serial No. 29,344.

This invention relates to brakes, and is illustrated as embodied in a front wheel automobile brake. An object of the invention is to provide an inexpensive universal support for the inner end of the usual control shaft operating the brake through a universal joint substantially in the swivelling axis of the wheel, by forming it as a pressed metal bracket secured to the chassis frame and having a socket portion receiving a ball member receiving the end of the shaft.

The above and other objects and features of the invention, including various novel combinations of parts and desirable particular constructions, will be apparent from the following description of one illustrative embodiment shown in the accompanying drawings, in which:

The figure is a vertical section through one front brake and associated parts.

In the arrangement selected for illustration, the invention is embodied in an automobile chassis including a frame 10, supported by suitable springs 12 on a rear axle (not shown) and on a front axle 14. At opposite ends of the front axle are swivelled by the usual king pins the knuckles 16 rotatably supporting the wheels (not shown). Each wheel is controlled by a brake, illustrated as including a drum 18 and internal shoes 20 operated by a cam 22. Cam 22 is rocked to apply the brake by a shaft 24 operated by an arm 26 and operating the cam 22 through a universal joint 28 substantially in the swivelling axis of the knuckle.

According to the present invention the inner end of the shaft 24 is supported, preferably slidably, by a ball member 30 perforated to receive it and formed with a groove 32 for grease or the like, and received in a socket portion formed in a pressed sheet metal bracket 34 riveted or otherwise secured to the frame 10. Preferably the ball member is further enclosed by a stamping 36 having an out-turned flange riveted or otherwise secured to an out-turned flange of the bracket 34, and shown as drawn out to provide a cup-shaped recess into which the end of shaft 24 may slide.

While one illustrative embodiment has been described in detail, it is not my intention to limit the scope of the invention to that particular embodiment, or otherwise than by the terms of the appended claims.

I claim:

1. Brake-operating mechanism including a shaft, and comprising, in combination therewith, a pressed metal support having at one end a flange to be secured to a chassis frame and extending upwardly at a substantial angle away from the flange and frame, and formed at its upper end with a half-socket, a ball in said half-socket supporting the end of the shaft, and a separate half-socket secured to the support and arranged on the opposite side of the ball.

2. Brake-operating mechanism including a shaft, and comprising, in combination therewith, a pressed metal support having at one end a flange to be secured to a chassis frame and extending upwardly at a substantial angle away from the flange and frame, and formed at its upper end with a half-socket facing away from the frame, a ball in said half-socket supporting the end of the shaft, and a separate half-socket secured to the support and arranged on the opposite side of the ball and facing toward the frame.

3. Brake-operating mechanism including a shaft, and comprising, in combination therewith, a pressed metal support havng at one end a flange to be secured to a chassis frame and extending upwardly at a substantial angle away from the flange and frame, and formed at its upper end with a half-socket, a ball in said half-socket supporting the end of the shaft, and a separate half-socket secured to the support and arranged on the opposite side of the ball, said two half-sockets having out-turned flanges which are secured together.

In testimony whereof I have hereunto signed my name.

ADIEL Y. DODGE.